US008429881B2

(12) United States Patent
James et al.

(10) Patent No.: US 8,429,881 B2
(45) Date of Patent: Apr. 30, 2013

(54) BALER STARTER ROLL

(75) Inventors: Charlie O. James, Newton, KS (US);
Cedric J Blough, Moundridge, KS (US);
Maynard M. Herron, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 233 days.

(21) Appl. No.: 12/562,697

(22) Filed: Sep. 18, 2009

(65) Prior Publication Data
US 2011/0067374 A1 Mar. 24, 2011

(51) Int. Cl.
*B65B 41/10* (2006.01)

(52) U.S. Cl.
USPC .................. 53/389.4; 53/441; 53/587

(58) Field of Classification Search .............. 53/399, 53/430, 441, 118, 389.2, 389.4, 587
See application file for complete search history.

(56) References Cited

U.S. PATENT DOCUMENTS

| | | | | |
|---|---|---|---|---|
| 5,129,207 A | * | 7/1992 | Butler | 53/118 |
| 5,129,208 A | * | 7/1992 | Van Zee | 53/118 |
| 5,181,461 A | | 1/1993 | Viaud | |
| 5,581,974 A | * | 12/1996 | Underhill et al. | 53/118 |
| RE35,882 E | * | 9/1998 | Butler | 53/118 |
| 5,941,168 A | | 8/1999 | Kluver | |
| 6,006,504 A | * | 12/1999 | Myers et al. | 53/556 |
| 6,021,622 A | * | 2/2000 | Underhill | 53/118 |
| 6,050,052 A | | 4/2000 | Herron et al. | |
| 6,209,450 B1 | * | 4/2001 | Naaktgeboren et al. | 100/4 |
| 6,446,548 B2 | * | 9/2002 | Chow | 100/4 |
| 6,606,843 B1 | | 8/2003 | Anstey et al. | |
| 6,655,121 B1 | * | 12/2003 | Viesselmann et al. | 56/341 |
| 6,769,224 B2 | * | 8/2004 | Anstey et al. | 53/118 |
| 6,966,162 B2 | * | 11/2005 | Viaud et al. | 53/64 |
| 6,981,352 B2 | * | 1/2006 | Chow et al. | 53/64 |
| 7,237,372 B2 | * | 7/2007 | Chapon et al. | 53/587 |
| 7,490,544 B1 | * | 2/2009 | Bollinger et al. | 100/5 |
| 7,644,563 B2 | * | 1/2010 | De Gersem | 53/587 |

FOREIGN PATENT DOCUMENTS

DE 29515629 U1 12/1995

OTHER PUBLICATIONS

Parts catalog for AGCO-Hesston 565A Round Baler, Sep. 1999, p. 9-60.
International Search Report for International Application No. PCT/IB2010/002315 Dated Jun. 10, 2011.

* cited by examiner

*Primary Examiner* — Paul R Durand

(57) ABSTRACT

In one embodiment, a starter roll for a baler includes a continuous chevron-shaped rib provided on a contact surface of the starter roll. The rib may include a center portion arranged generally parallel to the longitudinal axis of the starter roll and outwardly and rearwardly extending wings. A plurality of ribs may be provided to form guide channels for guiding wrapping material that is provided to the bale and engaged by the starter roll outward to cover the edges of a bale and distribute the wrapping material over the lateral surface of the bale.

5 Claims, 4 Drawing Sheets

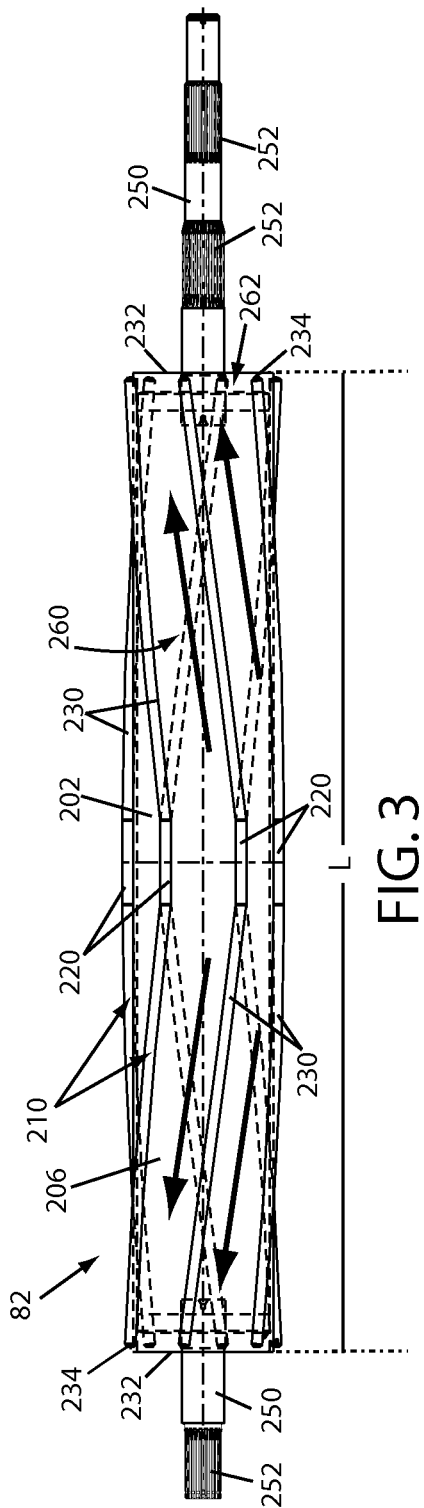
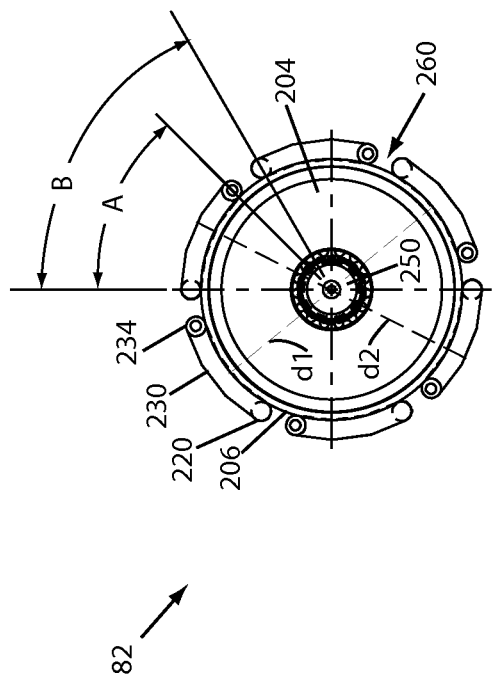

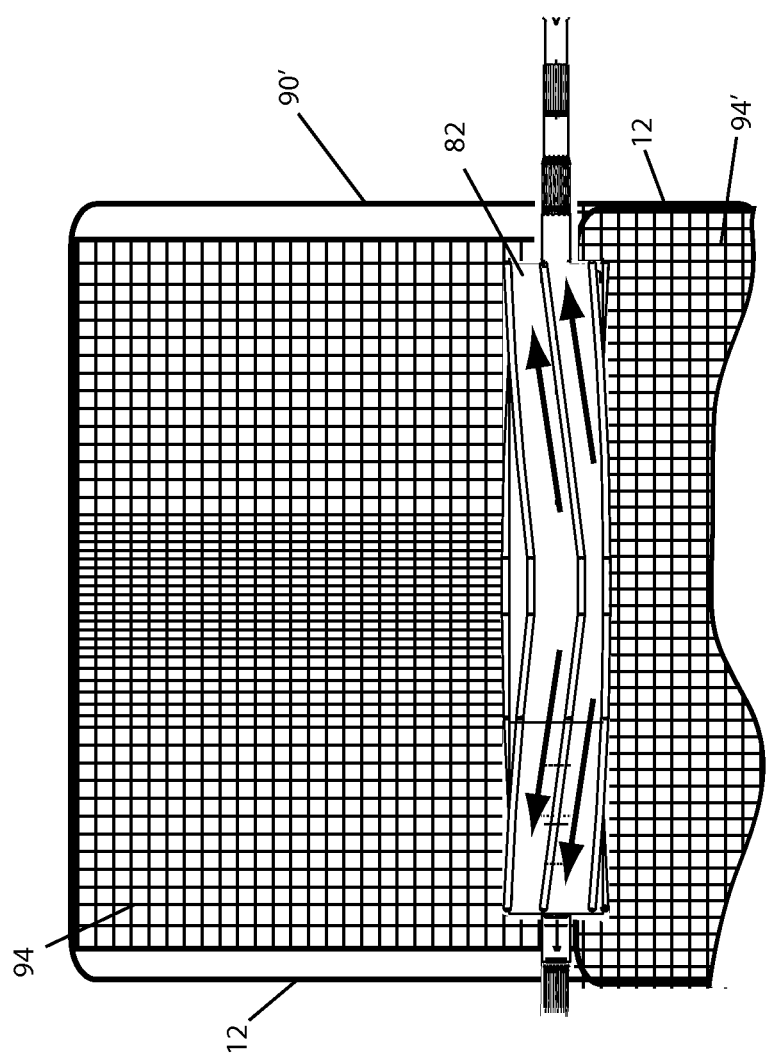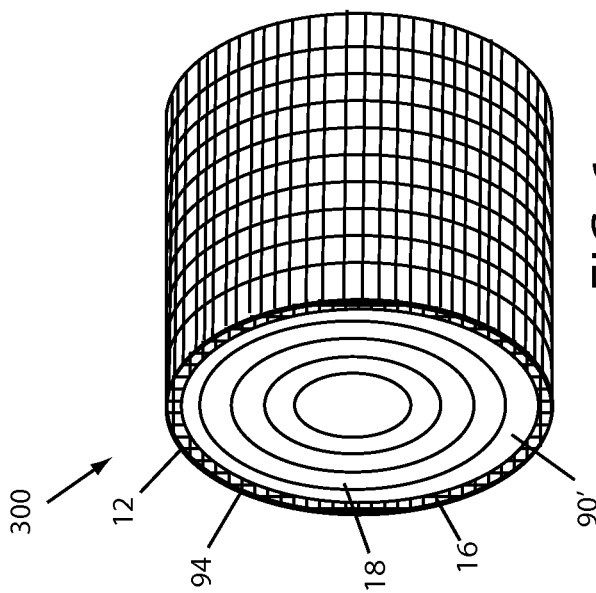

BALER STARTER ROLL

TECHNICAL FIELD

The present invention relates generally to round balers and, more specifically, to a starter roll configured for improved wrapping of a round bale with a wrapping material.

BACKGROUND

Farmers often use a baler to collect crop materials from a windrow and form the crop materials into a bale for transport or storage. Round balers are commonly used that include a starter roll located at a baling chamber inlet that engages the crop material in the baler and assists in rolling up the crop material into a bale as the crop material is processed in the baling chamber. The starter roll may be provided with a smooth, spiral, or helical surface for engaging crops. For example, U.S. Pat. No. 5,181,461 discloses a starter roll having a pair of ribs coated with or made of rubber or another friction enhancing material that are releasably attached to the roll for increasing its aggressiveness. In another embodiment, the roll has a pair of cylindrical shells releasably secured thereabout, the shells being coated with rubber or another friction enhancing material for increasing its aggressiveness.

Once a bale has been formed it is commonly wrapped with a wrapping material, such as a mesh wrap, twine, or the like, in order to keep the formed bale intact. For example, a baler may be provided with a wrapping mechanism that supplies a wrapping material to the baling chamber, wraps the bale in the baling chamber then kicks out a finished and wrapped bale.

The materials commonly used for wrapping a bale are generally lightweight and flimsy, however, leading to various difficulties in wrapping the bale. For example, the wrapping material is susceptible to being affected by factors such as wind, static electricity, and the like, and the material tends to bunch toward the center of the bale making it difficult to cover the edges of the bale or any desired portion of the bale sidewalls. For example, some wraps are provided with elastic ends that are meant to cover the outer edges of a bale. The prior art starter rolls described above tend to bias the wrapping material in the direction of the spiral thereby moving the wrapping material away from one of the edges of the bale, exacerbating the difficulties in properly wrapping a bale to cover the baled edges and sidewalls.

BRIEF DESCRIPTION OF THE DRAWINGS

FIG. 3 is a front view of the example embodiment of the starter roll shown in FIG. 2.

FIG. 4 is a right side view of the starter roll of FIG. 2.

FIG. 5 shows an example embodiment of a starter roll engaging a bale wrapping material covering a bale.

FIG. 6 shows an example embodiment of a bale wrapped using the starter roll of FIG. 2.

OVERVIEW

In an example embodiment, a bale-forming chamber is provided with a starter roll having a contact surface configured for starting the rotation of a bale within a bale-forming chamber and engaging and spreading a wrapping material about a round bale. In one example embodiment, a starter roll includes a plurality of ribs coupled to an outer circumferential surface of the starter roll, the ribs defining a plurality of guide channels for guiding the wrapping material laterally outward from the longitudinal center of the bale. An example rib may be in the form of a continuous bar coupled to the outer circumferential surface of the roll, the bar having a center portion extending generally parallel to the longitudinal axis of the starter roll and angled wings that extend outward and rearward from the center portion around the circumferential outer surface to the outer edges of the starter roll. In one example embodiment, a plurality of chevron-shaped ribs are provided to an outer circumferential contact surface of the starter roll to engage the wrapping material and spread the material laterally outward to the outer edges of a bale formed in a bale-forming chamber of a baler.

DETAILED DESCRIPTION

Figure 1:
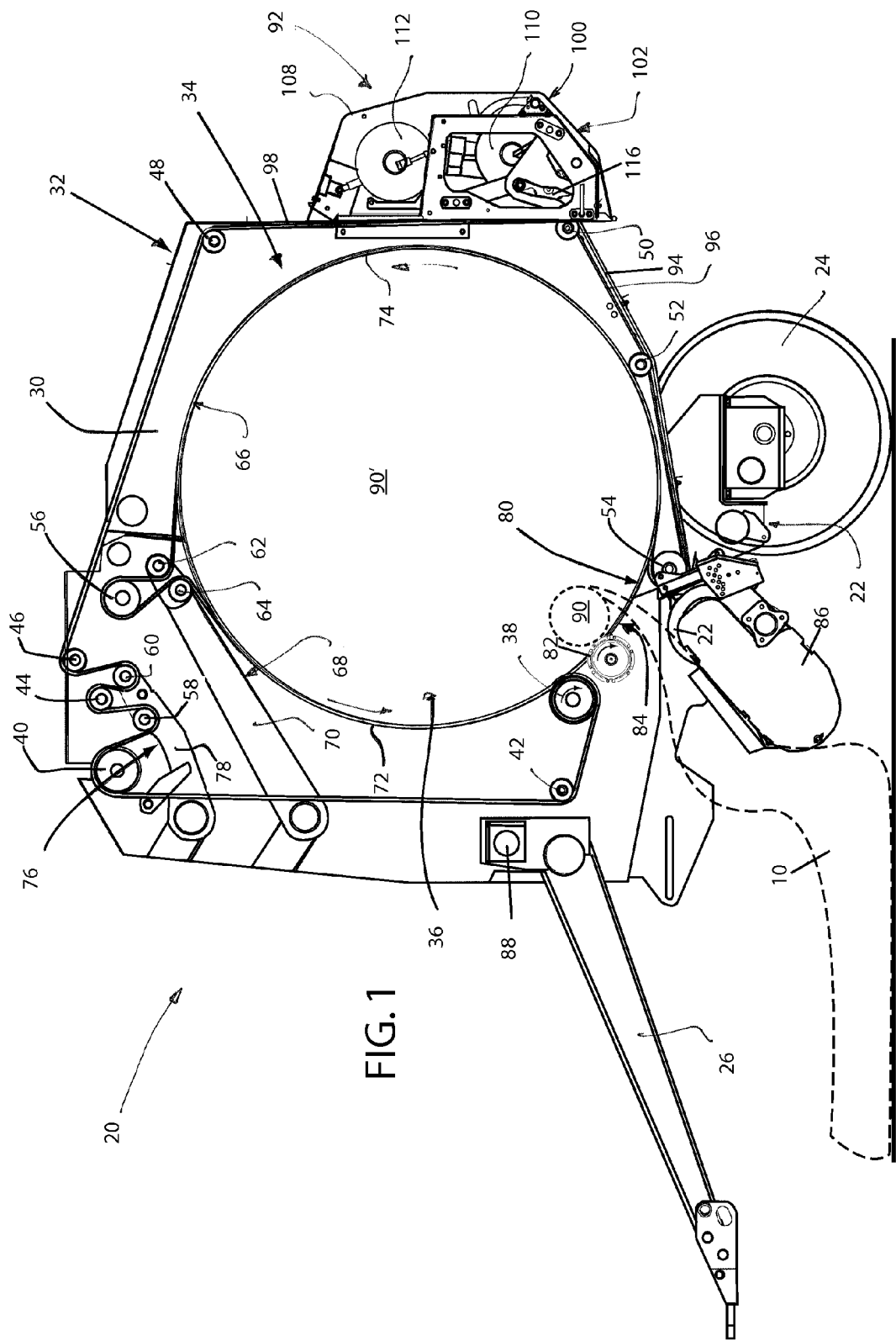
FIG. 1 is a left side elevational view of an example embodiment of a round baler having a wrapper dispensing mechanism and a starter roll for spreading a wrapping material about a bale.

Turning to the figures, wherein like numbers represent like elements throughout the several views, FIG. 1 shows a round baler 20 for use in baling crops. The baler 20 may include a chassis 22 that is supported for travel by a pair of ground engaging wheels 24 (only one wheel being shown in the drawing figures). A tongue 26 projects forwardly from the chassis 22 for connection with a towing vehicle (not shown). It is noted that directional references, such as up/down, front/rear or left/right orientation, are for informational purposes with reference to the particular figures in the disclosure and are not meant as limitations on the invention. The directional references of the baler 20 and the baler components of FIG. 1 are made from the reference point of standing behind the baler 20 and looking forward in the direction of travel. The chassis 22 may carry a pair of upright, laterally spaced sidewalls 30 (only one wall being shown in the drawing figures) that cooperate to define a space within which bale-forming and bale wrapping operations may be carried out as the baler 20 is advanced across a field.

The sidewalls 30 may present stationary forward portions fixed to the chassis 22 and rearward portions swingably attached to forward portions at an elevated pivot (not shown). Rearward portions of the sidewalls 30 may cooperatively define a tailgate 32 that is swingable between an open discharge position (not shown), in which the tailgate 32 is sufficiently raised to allow a completely formed bale to be discharged from the baler 20, and a closed baling position (FIG. 1), in which the bale-forming and wrapping operations are performed.

In the illustrated embodiment of FIG. 1, the baler 20 includes a bale-forming mechanism 34 that comprises a number of rolls and belts that cooperate with the sidewalls 30 to define an internal baling chamber 36 that assumes different shapes and sizes throughout the bale-forming cycle. In this respect, the example round baler 20 may be referred to as a "variable chamber" belt type machine, wherein the baling chamber 36 is initially relatively small, and then grows progressively larger as the bale 90 increases in diameter within the baler 20. It will be appreciated, however, that the principles of the present invention are also applicable to a "fixed chamber" machine (not shown) in which the dimensions of a baling chamber are at least substantially constant throughout the baling cycle, with the diameter of such a chamber corresponding substantially with the diameter of a full-size bale.

With the foregoing general explanation in mind, a bale-forming mechanism 34 of the illustrated baler 20 comprises a plurality of laterally extending, stationary rolls, including a lower drive roll 38, an upper drive roll 40, and a plurality of idler rolls 42, 44, 46, 48, 50, 52, 54, 56, 58, 60, 62, and 64. It is noted that a subset of the idler rolls 42-56 are stationary with respect to their position relative to the baler chassis 22, while another subset of the idler rolls 58-64 may be mounted to a swingable structure. It is also noted that additional rolls, such as trash clearing rolls or offsetting rolls could be incorporated into the bale-forming mechanism 34 without departing from the teachings of the present invention.

Stationary rolls 42-56 are arranged between the sidewalls 30 in a generally circular pattern (when viewed from the left side shown in FIG. 1) for guiding a plurality of laterally spaced continuous belts 66 as the belts 66 are driven linearly during bale formation and wrapping. While the bale-forming mechanism 34 of the depicted embodiment is made up of a plurality of belts 66, alternative baling elements, such as a single belt or a plurality of rollers (not shown) could alternatively be used in a baler, as will be understood by one of ordinary skill in the art, without departing from the teachings of the present invention.

The bale-forming mechanism 34 further includes a belt guiding or retaining assembly 68 having a pair of vertically swingable arms 70 (with only the right arm being shown in FIG. 1) located inside the baler 20 adjacent the sidewalls 30. The arms 70 support a pair of idler rolls 62, 64 in a position to directly overlie the bale during its formation within baling chamber 36. In addition, the arms 70 are yieldably biased downwardly so that rolls 62, 64 exert pressure against the top of the bale as it is being formed. It will be noted that belts 66 wrap under lower drive roll 38, over relatively large idler roll 56, and under idler roll 54 to present a pair of opposed, front and rear belt stretches 72, 74 that cooperate with sidewalls 30 to define a baling chamber 36.

In addition, the belts 66 are confined between retaining idler rolls 62, 64, and extend upwardly therefrom to wrap around relatively large idler roll 56, whereby vertical belt stretches 72, 74 converge toward one another as idler rolls 62, 64 are approached. Although not illustrated in detail, it will be appreciated by one of ordinary skill in the art that the baling chamber 36 consequently initially assumes a generally vertical, triangular configuration when baling chamber 36 is empty and arms 70 are in their lowermost position. When drive rolls 38 and 40 are rotated in a clockwise direction (as oriented in the illustration of FIG. 1), front belt stretch 72 moves in a downward direction, while rear belt stretch 74 moves in an upward direction, when baling chamber 36 is empty at the beginning of a new bale-forming cycle.

A slack control arm assembly 76 located in the upper front portion of baler 20 includes a pair of vertically swingable arms 78 (with only the right arm being shown in FIG. 1). Arms 78 support the other pair of movable idler rolls 58, 60. As will be readily appreciated by one of ordinary skill in the art upon review of this disclosure, slack control assembly 76 controls the amount of slack paid out to belts 66 as the bale grows within baling chamber 36. Baling chamber 36 is open at the bottom to present a baling chamber inlet 80 defined generally between a starter roll 82 and idler roll 54. The baling chamber 36 may be located above and off of the ground. Therefore, some pickup mechanism may be provided for picking up crop material 10 as the baler 20 moves across the field and for delivering the crop material 10 into the baling chamber 36. In the illustrated embodiment, the baler 20 is constructed in accordance with the principles of open throat, vertical chamber baling, such that incoming crop material 10 is not subjected to any significant compression until it passes through the inlet 80 and is fully received within the baling chamber 36. Thus, the part of the crop flow path upstream from the baling chamber 36 is open and non-compressive, and may be described as an open throat 84 through which the picked up crop material 10 passes on its way to the baling chamber 36.

Although not illustrated in detail, it will be readily appreciated by one of ordinary skill in the art that the baler 20 preferably includes a pickup header 86 having a standard resilient rotary rake tine assembly for picking material 10 up off of the ground. If desired, the rake tine assembly selected for use may be wider than baling chamber 36 in a direction transverse to the path of travel of the baler 20, in which case the baler 20 is preferably provided with the center-gathering stub augers 22, as will be understood by one of ordinary skill in the art upon review of this disclosure. In addition, the pickup header 86 may include a rigid tooth feeder positioned between the rake tine assembly and the chamber inlet 80 for delivering crop material 10 from the rake tine assembly into the baling chamber 36 during successive stuffing strokes.

Power for operating various components of the baler 20 can be delivered by a drive line (not shown) associated with the tongue 26. A front end of such a drive line can be adapted for connection to a power takeoff shaft (not shown) of the towing vehicle, while a rear end of the drive line can be coupled with a gearbox 88 mounted to the chassis 22. A gearbox 88 may be coupled with the various drives for the baler components in a conventional manner, as will be readily appreciated by one of ordinary skill in the art. Additional details of an example embodiments of a round baler are disclosed in U.S. Pat. No. 6,050,052 ("the '052 patent") and U.S. patent application Ser. No. 12/365,077 entitled "Mesh-wrap Dispensing Mechanism for Round Balers" filed Feb. 3, 2009, both of which are assigned to the assignee of the present application and both of which are hereby incorporated herein in their entirety to the extent not inconsistent with the present disclosure.

Thus, windrowed crop material 10 may be fed into the baler 20 by the pickup assembly 86 and moved to the chamber inlet 80 by augers 22 or other means and fed into the bottom of the open throat bale chamber 36. When in the bale chamber 36, the crop material 10 contacts the surface of the belt stretch 74 which is moving upward. The forming belts 66 may be driven by the upper 40 and lower 38 drive rolls so that the forming belts 66, 74 carry the crop material 10 to the top of the chamber 36 and the motion of the forming belts 66, 72 turns the crop material 10 downward against the starter roll 82 so that a core is started and begins to roll. The crop material 10 may be initially formed into a small bale 90 (shown in dashed lines in FIG. 1) within the baling chamber 36 and the process continued to form an enlarged bale 90' of a desired size.

Once a bale of crop material 10 reaches its full size, such as the large bale 90', it may be desirable to tightly wrap the bale 90' before discharging the bale 90' from the baling chamber 36. Thus, the baler 20 may further broadly include a wrapping apparatus 92 for wrapping a formed bale 90' with a wrapping material 94 once the bale-forming cycle has been completed. While the formed bale 90' is illustrated as being fully formed, it is also possible to wrap a partially formed bale with the wrapping apparatus 92 without departing from the teachings herein.

In the example embodiment shown in FIG. 1, a wrapping apparatus 92 is disposed at the rear of baler 20 so that a wrapping material 94 dispensed by the wrapping apparatus 92 travels forwardly to a baling chamber access opening (chamber inlet 80 in the illustrated embodiment, although an alternative opening could be used without departing from the teachings of the present invention) to wrap around the formed bale 90'. A pan 96 extends generally between a rearwardmost belt stretch 98 and the idler roll 54. The pan 96 is spaced slightly below the belts 66 as they travel from the idler roll 50, past the idler roll 52, and to the idler roll 54, such that the forwardly moving belts 66 convey the wrapping material 94 along the pan 96.

The bale wrapping apparatus 92 may generally include a housing 100 that contains wrapping material 94 and a wrapper dispensing mechanism 102 for paying out lengths of wrapping material 94 during the bale wrapping cycle. The rear boundary of housing 100 is defined by a rear wall 108 that can be opened to provide access to the interior of housing 100. Within the housing 100, a roll of supply material 110 is supported and provides a source of wrapping material 94 for the bale wrapping cycle.

A feed roller 116 may be supported on a rockable swing frame that allows the feed roller 116 to shift between a first, belt-disengaged position and a second, belt-engaged position. When the feed roller 116 is in the engaged position with a rearwardmost belt stretch 98, it creates a temporary nip (not shown) to pull the wrapping material 94 downstream along pan 96 and into chamber inlet 80 where it wraps around fully formed bale 90.

Once the length of wrapping material 94 has been brought into contact with the belt stretch 98, such that the wrapping material 94 is being paid out into the baling chamber 36, it is possible to move the feed roller 116 from a second position to an intermediate position (not shown), whereby the downstream engagement between the wrapping material 94 and the belts 66 continues to pull wrapping material 94 from the supply roll 110 around the feed roller 116.

In order to increase tension of the wrapping material 94 being paid out by the wrapper dispensing mechanism 102, a braking assembly (not shown) may be incorporated to slow (or completely stop) rotation of feed roller 116. A cutting assembly (not shown) may also be provided to sever the wrapping material 94 such that the fully formed and wrapped bale 90' may be removed from baler so that formation of a new bale may begin.

The starter roll 82 may be used to spread the wrapping material 94 across the bale 90' to the bale's edges 12 (FIG. 6). For example, the starter roll 82 may engage the wrapping material 94 after it is applied in the baling chamber 36 to spread the wrapping material 94 laterally outward across the formed bale 90' to the bale's outer edges 12.

Figure 2:
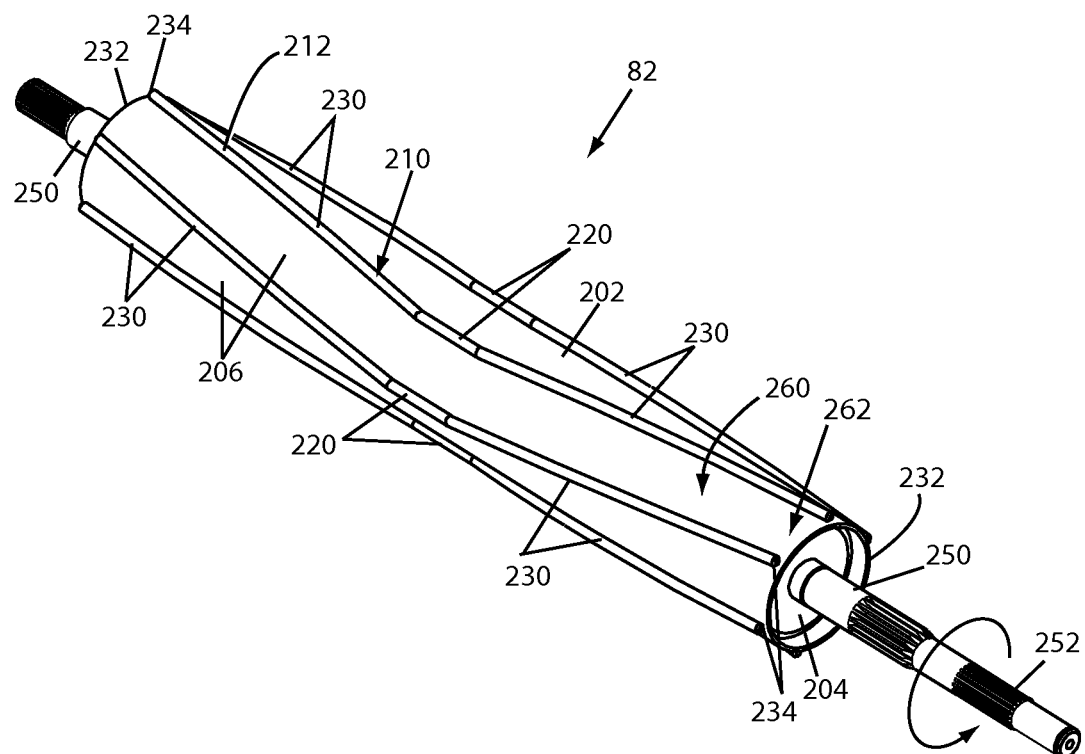
FIG. 2 is a perspective view of an example embodiment of a starter roll.

As shown in the example embodiment of FIG. 2, the starter roll 82 may include a core 204 covered by a generally cylindrical body 202 having a generally smooth outer circumferential contact surface 206. A plurality of continuous ribs 210 of generally elliptical cross section and rounded outer surface 212 may be provided on the circumferential contact surface 206 for engaging the wrapping material 94. The ribs 210 may have of a general chevron-shape and include a center portion 220 and opposing wing portions 230. The center portion 220 may extend generally parallel to the longitudinal axis of the starter roll 82 and be positioned at the longitudinal center of the starter roll 82.

In the example embodiments shown in FIGS. 1 and 2, the starter roll 82 may be arranged in the baler 20 to rotate in the direction indicated by arrows so that the center portion 220 defines a leading edge of the rib 210 when in the starter roll 82 is in use. The wings 230 may extend outwardly and rearwardly (downstream when in use) from the outer ends of the center portion 220 toward the outer edges 232 of the cylindrical body 202 so that outer ends 234 of the wings 230 define trailing edges of the rib 210. The spaces between adjacent ribs 210 may define a plurality of channels 260 for receiving wrapping material 94 and guiding the wrapping material 94 downstream through the channels 260 and out an open end 262 of the channels 260 to urge the wrapping material 94 laterally outward from the center of the ribs 210 toward the outer edges 232 of the cylindrical body 202. In an example embodiment the channels are continuous along the length of the roll. The ribs may be made of any suitable material, such as by way of example, and not limitation, ½" diameter round steel rods that are welded to the circumferential surface 206 of the starter roll 82.

In an example embodiment, the ribs 210 may be spaced apart around the cylindrical contact surface 206 to provide a desired arrangement of guide channels 206. For example, as shown in FIG. 4, each rib 210 may extend over the circumferential surface an angle A, and the ribs 210 spaced apart an angle B on center. In the example embodiment shown in FIG. 4, A is 45 degrees so that each rib 210 extends a circumferential distance of about 45 degrees on center about the circumferential surface 206 of the starter roll 82 and B is 60 degrees so that the ribs 210 are spaced about 15 degrees apart. In that arrangement six ribs 210 are provided which create six guide channels 206 with each channel having a width of about 3 inches between bars.

In the example embodiment, the cylindrical body 202 has a longitudinal length of about 46¼" for a 4' wide baler or 61³⁄₁₆" for a 5' wide baler, an outer diameter d1 (FIG. 4) of about 6⅝", and the ribs 210 have an outer height of about ½" so that the outer diameter d2 across the starter roll including two opposing ribs 210 is about 7⅝". In the example embodiment, the cylindrical body 202 has a longitudinal length L (FIG. 3) of about 46¼" for a 4' wide baler and 61³⁄₁₆" for a 5' wide baler and the wings 230 extend a longitudinal length of about 45¾" for a 4' wide baler and 60¾" for a 5' wide baler to leave a small space of about ¼" between the outer ends 234 of the wings 230 and the outer edge 232 of the cylindrical body 202. The outer ends 234 of the wings 230 may be beveled and smoothed to prevent snagging on the wrapping material 94.

Shafts 250 may be provided that extend outwardly from the core 204 of the starter roll 82 and rotatatably mounted on the baler 20 as known in the art. The shafts may include teeth 252 for engaging gears (not shown) provided on the baler 20 to control the rotation of the starter roll 82 with respect to the bale 90' and the wrapping material 94. In an example method of applying wrapping material 94 to the bale 90' the starter roll 82 may be rotated at a speed such that its peripheral speed and the speed of the ribs 210 engaging the outer surface of the bale 90' (and the wrapping material 94 provided to the bale) is different, (such as slower or faster), than the peripheral speed of the wrapping material 94 as the wrapping material 94 is rotated in the bale-forming chamber 36 to assist in removing slack in the wrapping material 94 form the bale 90'.

Once the bale 90' has been formed and the wrapping material 94 provided to the baling chamber 36 so that the wrapping material 94 attaches to the bale 90', the bale 90' rotates counterclockwise with the wrapping material 94 thereon. The ribs 210 of the starter roll 82 urge the wrapping material 94 outward to spread the wrapping material 94 to the outer edges 12 of the bale 90' (FIG. 5). As shown in FIG. 5, wrapping material 94 may be applied to the bale 90' in such a manner that the wrapping material is bunched near the center of the bale 90' with the edges 12 of the bale 90' left uncovered. The starter roll 82 may engage the wrapping material 94 so that the ribs 210 engage the wrapping material and urge the wrapping material 94 through the channels 260 outward to the cover the outer edges 12 of the bale 90' to arrange the wrapping material 94' as shown below the starter roll 82 to produce the wrapped bale 300 shown in FIG. 6 having edges 12 covered by the processed wrapping material 94'. For example, the bale 90' may have a width of 48 inches and a wrapping material 94 of a width of 52 inches may be provided to the bale 90' within the baling chamber 36 by a wrapping mechanism 92 as described above. The ribs 210 of the starter roll 82 may engage the wrapping material 94 as the starter roll 82 is rotated against the bale 90'. As the starter roll 82 continues to engage the wrapping material 94 the angled wings 230 engage the wrapping material 94 to urge the wrapping material 94 laterally to produce a wrapping material 94' arrangement which covers the edges 12 of the bale 90'. As previously mentioned, the starter roll 82 may be driven independently from the belts used for the bale-forming chamber 36 so that starter roll 82 has a greater peripheral speed than the wrapping material 94 on the 90' to assist in removing slack in the wrapping material 94 form the bale 90'.

This process is especially useful with cover edge mesh wrapping material that has elastic outer edges 16 for extending over the edges 12 of the bale 90' and slightly down the bale sides 18 to give a clean neat look. Unlike prior art starter rolls that include spiral bars that tend to urge the mesh to one side of a round bale in direction of the spiral, the starter roll 82 of the example embodiment shown in FIG. 1 urges the mesh laterally outward from a longitudinal center to evenly spread the wrapping material 94 over the bale. Depending upon the material used for the wrapping material 94, the lateral urge provided by the starter roll 82 may smooth or stretch the wrapping material 94 laterally across the bale.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. For example, the ribs described above could be oriented in an opposite direction, the starter roll could be rotated in an opposite direction, and/or the rotational speed of the starter roll could be varied relative to the rotation of the bale, or other changes could be made that are within the scope of the invention. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A starter roll for a round baler, comprising:
   a body having an outer circumferential contact surface to contact a bale of crop material within a baling chamber of a baler, the bale having at least a portion of wrapping material applied thereto; and
   at least one rib provided on the outer circumferential contact surface to contact the wrapping material and urge the wrapping material laterally outward over the bale, wherein the at least one rib comprises:
   a center portion extending parallel to the longitudinal axis of the body, the body having first and second outer edges; and
   a first wing extending from the center portion toward the first outer edge of the body; and
   a second wing extending from the center portion to the second outer edge of the body.

2. A round baler comprising:
   a baling chamber; and
   a starter roll configured to start rotation of crop material within the baling chamber into a bale and spread wrapping material about a bale, the wrapping material applied to the bale prior to engagement by the starter roll, the starter roll comprising,
   a body having an outer circumferential contact surface to contact a bale of crop material within the baling chamber, the bale having at least a portion of wrapping material applied thereto, and
   at least one rib provided on the outer circumferential contact surface to contact the wrapping material and urge the applied wrapping material laterally outward over the bale, wherein the at least one rib comprises,
   a center portion extending parallel to the longitudinal axis of the body, the body having first and second outer edges;
   a first wing extending from the center portion toward the first outer edge of the body; and
   a second wing extending from the center portion to the second outer edge of the body.

3. A round baler comprising:
   a baling chamber; and
   a starter roll configured to start rotation of crop material within the baling chamber into a bale and spread wrapping material about a bale, the wrapping material applied to the bale prior to engagement by the starter roll, the starter roll comprising,
   a body having an outer circumferential contact surface to contact a bale of crop material within the baling chamber, the bale having at least a portion of wrapping material applied thereto, and
   at least one rib provided on the outer circumferential contact surface to contact the wrapping material and urge the applied wrapping material laterally outward over the bale, wherein the at least one rib comprises:
   a center portion extending parallel to the longitudinal axis of the body, the center portion having a leading edge at a longitudinal center of the body, the leading edge extending generally parallel to a longitudinal axis of the body; and
   angled wings extending rearward from the center toward the outer edges of the body.

4. A round baler comprising:
   a baling chamber; and
   a starter roll configured to start rotation of crop material within the baling chamber into a bale and spread wrapping material about a bale, the wrapping material applied to the bale prior to engagement by the starter roll, the starter roll comprising,
   a body having an outer circumferential contact surface to contact a bale of crop material within the baling chamber, the bale having at least a portion of wrapping material applied thereto, and
   at least one rib provided on the outer circumferential contact surface to contact the wrapping material and urge the applied wrapping material laterally outward over the bale, wherein the at least one rib comprises:
   a leading edge extending parallel to the longitudinal axis of the starter roll; and
   a pair of wings extending from the leading edge, the wings extending outward and rearward from the leading edge.

5. The round baler of claim 4, wherein the wings are angled at a 45 degrees from the leading edge.

* * * * *